(No Model.)

R. W. KEAR.
JOINT FOR ELECTRIC CONDUCTORS.

No. 305,601. Patented Sept. 23, 1884.

WITNESSES:
F. McArdle.
C. Sedgwick

INVENTOR:
R. W. Kear
BY Munn & Co.
ATTORNEYS.

UNITED STATES PATENT OFFICE.

RICHARD W. KEAR, OF POTTSVILLE, PENNSYLVANIA.

JOINT FOR ELECTRIC CONDUCTORS.

SPECIFICATION forming part of Letters Patent No. 305,601, dated September 23, 1884.

Application filed June 5, 1884. (No model.)

*To all whom it may concern:*

Be it known that I, RICHARD W. KEAR, of Pottsville, county of Schuylkill, Pennsylvania, have invented a new and Improved Joint for Electric Conductors, of which the following is a full, clear, and exact description.

The object of my invention is to provide a new and improved device for uniting the ends of telegraph, telephone, and electric-light wires, and other electric conductors.

The invention consists in a joint-piece for electric wires formed of a piece of tubing having a longitudinal slot in one side, and an aperture diametrically opposite the same in the other side, in which aperture a screw is held, which presses the ends of wires passed into the ends of the piece of tubing into the slot in the tubing, thus holding the wires in place.

Reference is to be had to the accompanying drawings, forming part of this specification, in which similar letters of reference indicate corresponding parts in all the figures.

Figure 1:
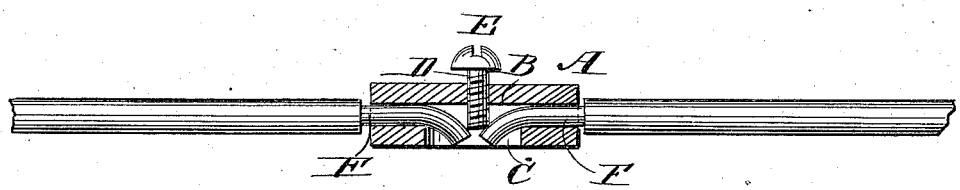
Figure 2:
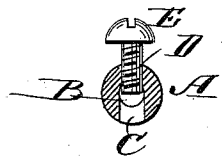
Figure 3:

Figure 1 is a longitudinal sectional elevation of my improved joint for electric-light wires. Fig. 2 is a cross-sectional elevation of the same, and Fig. 3 is a plan view of the under side of the same.

A short tubular socket, A, having an aperture, B, extending from end to end, is provided with a longitudinal slot, C, extending from the surface to the longitudinal aperture B or bore, and diametrically opposite the slot C a screw-threaded aperture, D, is formed, which extends from the surface to the bore, and in which aperture D a binding-screw, E, is screwed. The ends of the wires F are passed into the opposite ends of the tubular socket A until the ends of the wires abut below the aperture D. The screw E is then turned down and presses and bends the ends of the wires F down into the slot C, as shown, thus holding the ends of the wire securely in the tubular socket in such a manner that they cannot be withdrawn. The screw and the tubular socket form a good electrical connection between the wires F. If the wires are coated, the ends passed into the ends of the tubular socket must be bared.

The socket-piece can be made any suitable size according to the size of the wires.

I am aware that it is old to employ a tubing with a lateral opening near each end, into which each of the adjoining ends of two sections of an electric conductor is held by a binding-screw.

Having thus described my invention, I claim as new and desire to secure by Letters Patent—

The combination, with the tubular socket A, having a longitudinal slot, C, and an aperture, D, diametrically opposite the slot, of the screw E, held in the aperture D, and of the electric conductors or wires having their ends inserted in the ends of the tubular socket and bent into the slot C by the screw E, substantially as herein shown and described.

RICHARD W. KEAR.

Witnesses:
  CHAS. W. BARKER,
  CHAS. T. BROWN.